United States Patent [19]

Gentile et al.

[11] 4,133,216

[45] Jan. 9, 1979

[54] GEAR SUPPORT ASSEMBLY

[75] Inventors: Patrick J. Gentile; Joseph P. Gentile, both of Pittsburgh, Pa.

[73] Assignee: Vamco Machine & Tool, Inc., Pittsburgh, Pa.

[21] Appl. No.: 861,202

[22] Filed: Dec. 16, 1977

[51] Int. Cl.$^2$ .................. F16H 35/00; F16H 1/06; F16H 27/04
[52] U.S. Cl. .................................... 74/384; 74/84 R; 74/414
[58] Field of Search ........... 74/84 R, 414, 384, 412 R, 74/421 R

[56] References Cited

U.S. PATENT DOCUMENTS

| | | | |
|---|---|---|---|
| 3,261,217 | 7/1966 | Schick | 74/84 R |
| 3,483,782 | 12/1969 | Eyberger | 83/202 |

OTHER PUBLICATIONS

"A Cam Feed———Next Step Forward in Pressroom Technology", in 'Metal Stamping', Apr., 1976, by Dan Daniels.

*Primary Examiner*—Leonard H. Gerin
*Attorney, Agent, or Firm*—Stanley J. Price, Jr.; John M. Adams

[57] ABSTRACT

Drive and driven shafts are rotatably supported in a wall portion of a press frame and have free end portions extending into a gear case. A first drive gear is nonrotatably secured to the drive shaft and a second driven gear is nonrotatably secured to the driven shaft. A T-shaped member is pivotally connected to the wall and has an intermediate shaft member nonrotatably positioned in a slot for longitudinal movement therein. The intermediate shaft has a free end portion extending into the gear case with intermediate gears rotatably mounted thereon. The T-shaped member is arranged to be suitably adjusted to maintain different sized intermediate gears in meshing relation with different sized drive and driven gears so that the drive shaft imparts a preselected angular velocity to the driven shaft through the gear train. A pair of support arms each have an aperture adjacent one end and an elongated longitudinally extending slot adjacent the other end. Bearing members are mounted in the apertures and the ends of the drive and driven shafts are mounted in the bearings for rotation relative to the support arms. The slotted portions of the support arms are positioned in overlying relation with the intermediate shaft end portion extending therethrough. A nut secures the support arms in position on a threaded end portion of the intermediate shaft and thus the support arms connect the free ends of the three shafts to provide support for the end portions of the three shafts in the gear case and eliminate the torsional stress imparted to the shafts particularly the intermediate shaft.

8 Claims, 2 Drawing Figures

GEAR SUPPORT ASSEMBLY

BACKGROUND OF THE INVENTION

1. Field of the Invention

This invention relates to a gear support assembly for rotatably supporting a change speed gear train, and more particularly to a pair of support arms that rotatably support the free end portions of shaft members having meshing gears positioned thereon.

2. Description of the Prior Art

In press feeding operations it is known to feed a strip of stock material from a coil to the dies of the press for punching, stamping, cutting or the like of a preselected length of the material. The material is fed at a preselected linear speed from the coil in timed relation with the punching operation so that when the dies contact the material, the material is released from the feed mechanism so that movement of the material to the dies is interrupted. After the punching operation is completed, the feed mechanism advances another preselected length of the material to the dies. With this arrangement, the feeding of the material to the press is intermittent and coordinated with each downward stroke of the dies, so that prior to each downward stroke of the press, a new length of the material is in position for punching.

As disclosed in the April, 1976, publication of *Metal Stamping* by the article entitled "A Cam Feed . . . Next Step Forward in Pressroom Technology", it is known to utilize cam-type feeds for translating rotary motion of the punch press crankshaft to linear motion of the stock material. This is accomplished by drivingly connecting the feed roll of the feed mechanism through a change speed gear train and a drum-type cam to the drive shaft of the press. As disclosed in U.S. application Ser. No. 836,310 filed Sept. 26, 1977, the drum-type cam converts the continuous, uniform rotary motion of the crankshaft to non-continuous, step-by-step, intermittent rotary motion. The intermittent rotary motion from the drum-type cam is transmitted to a drive shaft of the feed mechanism. The drive shaft is drivingly connected through a change speed gear train to a driven shaft. The driven shaft is intermittently rotated at a preselected speed as determined by size and arrangement of the gears in the gear train. The driven shaft supports a feed roll and is intermittently rotated by the driven shaft at a preselected angular velocity to feed a preselected length of strip material to the press for each punching stroke. In order to rapidly change the length of the material fed to the punch press by the feed device, the gears in the gear train are changed to change the angular velocity between the drive and driven shafts. In this manner the angular velocity of the feed roll is changed which, in turn, results in a change in the length of the strip material fed to the press.

As disclosed in the above article, the drive shaft is drivingly connected through a change speed gear train to the driven shaft. The gear train includes a first drive gear nonrotatably connected to the drive shaft and a second driven gear nonrotatably connected to the driven shaft. A pair of intermediate gears drivingly connect the first drive gear to the second driven gear. The intermediate gears are rotatably supported on an intermediate shaft that is mounted on a support arm within the gear case. This arrangement permits the rapid change of sets of gears to thus change the feed length of the material fed to the press.

To insure accurate lengths of strip material being fed to the press, it is essential to maintain the same meshing relation between the gears in the gear train. Deflection of the shafts supporting the gears of the gear train especially the intermediate shafts adversely effects the accuracy of the feed device. In order to provide for rapid gear changes, it is desirable for the shafts supporting the gears to be rotatably supported and have free end portions extending into the gear case. The free end portions provide easy accessibility to the change speed gears and permit rapid change of the respective gears. The shafts having free end portions extending into the gear case are, however, subject to torsional deflection resulting from the torsion exerted by the input drive shaft. This is particularly true because of the intermittent drive imparted to the drive shaft by the cam drive mechanism. The torsional deflection tends to spread the gears apart and results in minor inaccuracies in the feeding operation.

There is a need for a support assembly to rigidly support the shaft end portions of all of the shafts within the gear case to prevent deflection of the shafts and maintain the same meshing relation between the gears on all of the shafts. The support assembly should not, however, materially increase the time required to change the gears in the gear train to provide a change in the feed length of the strip material.

SUMMARY OF THE INVENTION

In accordance with the present invention, there is provided a gear support assembly comprising a gear case and a drive shaft rotatably supported in a wall. The drive shaft has a free shaft end portion extending into the gear case. A first gear is nonrotatably secured to the drive shaft adjacent the drive shaft end portion. A driven shaft is rotatably supported in the wall in spaced parallel relation to the drive shaft with a free end portion of the drive shaft extending into the gear case. A second gear is nonrotatably secured to the driven shaft adjacent the driven shaft end portion. Intermediate gear means are positioned in meshing relation with the first gear and second gear for transmitting rotation from the drive shaft to the driven shaft. The wall has gear change means connected thereto. An intermediate shaft is supported by the gear change means and has a free end portion. The intermediate shaft rotatably supports the intermediate gears in meshing relation with the first gear and the second gear. First support means is rotatably connected to the drive shaft end portion and second support means is rotatably connected to the driven shaft end portion. The first and second support means are rigidly connected to the intermediate shaft to thereby connect the end portions of all of the shafts and prevent deflection of all of the shafts.

The first and second gears, as well as the intermediate gears, are easily accessible to facilitate a rapid change of the gears in order to change the angular velocity transferred from the drive shaft to the driven shaft. This is desirable particularly in press feeding operations where the driven shaft rotates a feed roll. The angular velocity of the feed roll determines the rate of feed to a press for continuous feeding and the length of feed to the press for intermittent feeding of stock material. Thus, a change in the angular velocity of the driven shaft is accomplished by changing the size of the gears in the gear train that drivingly connect the drive shaft to the driven shaft.

The intermediate shaft that rotatably supports the intermediate gears is mounted on an intermediate shaft support or gear change means that includes a T-bar having an end portion pivotally connected to the gear case and an opposite end portion that is releasably secured to the gear case. The T-bar is arranged to be moved into a preselected pivotal position for supporting different sized intermediate gears in meshing relation with different sized first and second gears. The intermediate shaft is slidably retained on the T-bar and extends through a longitudinal slot in the T-bar to permit linear movement on the intermediate shaft on the T-bar. With this arrangement the intermediate shaft is linearly and pivotally movable to a preselected position as determined by the size of the intermediate gears and the first and second gears.

The opposite end of the intermediate shaft member that is slidable on the T-bar is connected to the first and second support devices through longitudinally extending slots in the support devices. The support devices are pivotally supported at their end portions on the drive and driven shaft end portions respectively. With this arrangement, the support devices are pivotal about the longitudinal axes of the drive and driven shafts.

The support devices are positioned in overlapping relation so that portions of the slots of the support arms are aligned with the intermediate shaft member that supports the intermediate gears. The intermediate shaft member is movable in the slots of the support arms, as well as in the slot of the T-bar to permit the support arms to be pivoted to a preselected position for securing the arms of the shaft member when the first and second gears are positioned in meshing relation with the intermediate gears. Thus, with this arrangement the support arms may be pivoted to the position corresponding to the pivoted position of the shaft member on the T-bar so that the end of the shaft member extends through the slots of the support arms.

The support arms are restrained against longitudinal movement on the intermediate shaft member by washer and nut combinations which abut the support arm to urge the support arms into abutting fixed relation. The support arms are releasably secured to the drive and driven shafts by washer and screw combinations. With this arrangement, a rigid connection is provided between the support arms and the shafts. A bushing on the shaft member spaced from the support arms rotatably supports the intermediate gears on the shaft member. When the gears are positioned in meshing relation and the support arms are secured to the shaft member of the intermediate gears, the arms are secured to the end portions of all of the shafts. This provides an arrangement for securely supporting the end portions of the shafts and prevents deflection of the shafts during acceleration and deceleration of the shafts.

The support arms may be easily and rapidly removed from the respective shafts to facilitate a gear change by removing the external nut on the intermediate shaft and the screws on the drive and driven shafts. After the gear change has been completed, the support arms may be quickly repositioned by reversing the procedure.

Accordingly, the principal object of the present invention is to provide a gear support assembly for a drive train that transmits rotation from a drive shaft to a driven shaft through an intermediate shaft where the gear support assembly can be quickly removed so that the drive train can be rapidly changed to change the angular velocity of the driven shaft.

Another object of the present invention is to provide a gear support assembly for a drive train that rigidly supports the ends of all of the shafts and prevents deflection of the shafts and yet permits a rapid change in the gear train to effect a change in the angular velocity of the driven shaft for press feeding operations.

These and other objects of the present invention will be more completely disclosed and described in the following specification, the accompanying drawings and the appended claims.

DESCRIPTION OF THE PREFERRED EMBODIMENT

Figure 1:
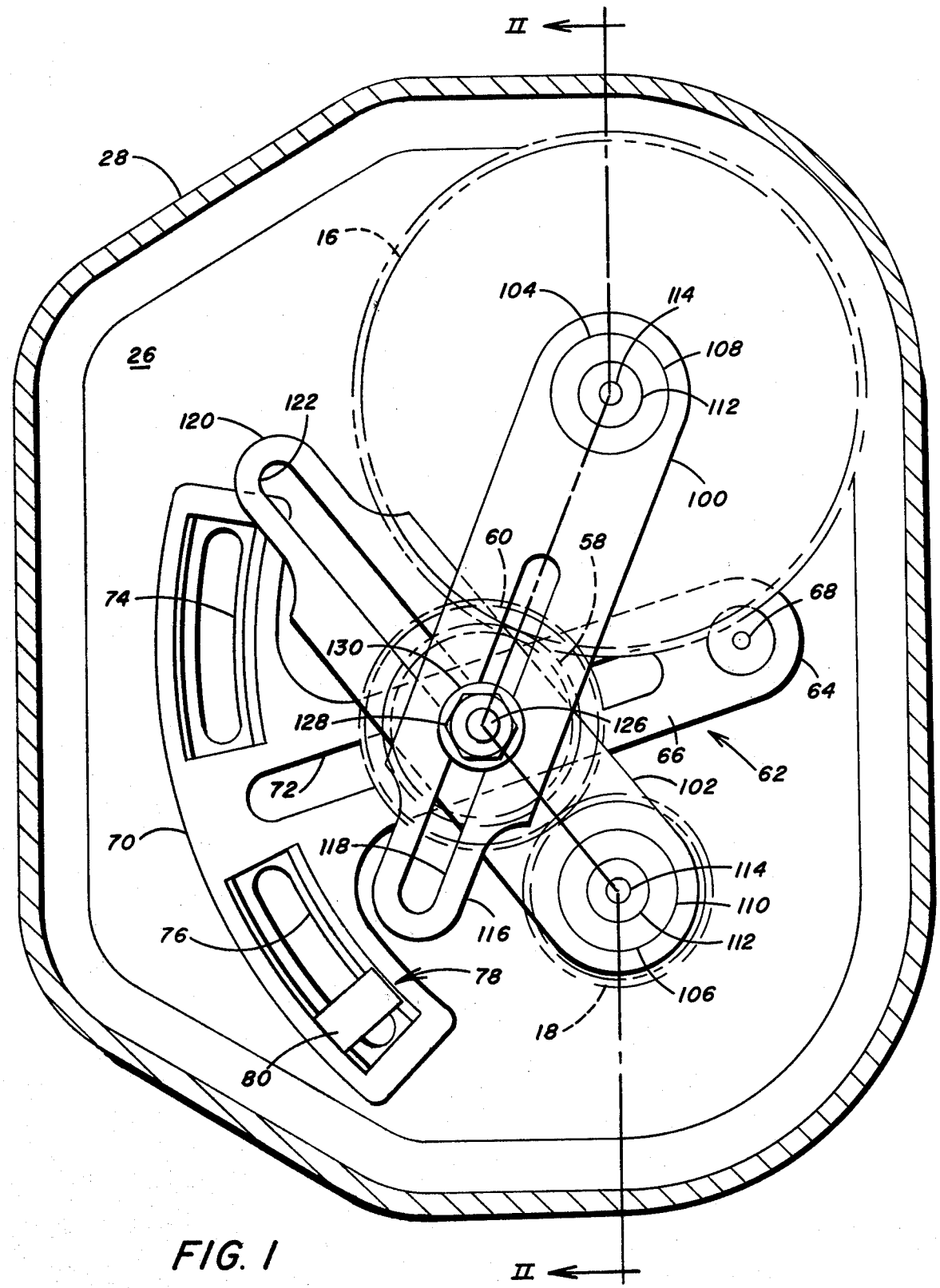
FIG. 1 is a view in side elevation and partially in section of a gear support assembly, illustrating a gear train for transmitting rotation from a drive shaft to a driven shaft where all the shaft end portions are rigidly supported by support arm members.

Referring to the drawings, there is illustrated a gear support assembly generally designated by the numeral 10 for a gear train of a punch press feed device. The press feed device has a drive shaft 12 and a driven shaft 14 that rotatably supports gears 16 and 18 for transmitting rotation from the drive shaft 12 through a plurality of intermediate gears generally designated by the numeral 20 to the gear 18 for rotating the driven shaft at a preselected angular velocity. In a specific application, such as in press feeding operations, as disclosed in U.S. application Ser. No. 836,310, rotated from the crankshaft of a punch press is transmitted to drive shaft 12 of the press feed and therefrom through the meshing gear train to the driven shaft 14.

A feed roll (not shown) is nonrotatably supported by the driven shaft 14 to advance at a preselected speed and/or a preselected length of stock material to a press where the stock material is punched in accordance with a preselected pattern. With this arrangement, rotary motion of the punch press crankshaft is translated to linear motion of the stock material by rotation of a feed roll mounted on the driven shaft 14, as will be explained hereinafter in greater detail. The continuous uniform motion of the crankshaft may be converted to a noncontinuous, step-by-step, intermittent motion by a cam drive to the drive shaft 12. The feed roll mounted on the driven shaft 14 is thus intermittently rotated to feed a preselected length of a stock material to the punch press for each punching stroke.

In accordance with the present invention, in order to effect a change in the rate of feed of the stock material to the punch press and/or to change the feed length of the stock material to the punch press, the gear train formed by the gears 16, 18 and 20 may be quickly changed to provide a preselected speed ratio between the drive shaft 12 and the driven shaft 14. The drive shaft 12 is rotatably supported by bearings (not shown) in a press feed wall or frame 26 and has an oil seal 22 in the bore of the wall 26 that surrounds the drive shaft 12. The wall 26 has a gear case generally designated by the numeral 25 secured thereto. The gear case 24 includes a housing 28 which is secured by bolts 30 to the wall 26. The housing has a lubricant opening 32 into the housing 28. The housing has an access opening 34 that is sealed by a cover plate 36 removably secured by fastening members 38 to the housing. The opening 34 provides access into the housing for making a gear change.

The driven shaft 14 is rotatably supported in the wall 26 by bearings 40. The shafts 12 and 14 include shaft free end portions 42 and 44 respectively that extend into the gear case. The drive shaft 12 has a conical gear support portion 46 adjacent the shaft end portion 42 for receiving the gear 16. The gear 16 is retained on the gear support portion 46 of shaft 12 by a washer 48 that is urged into abutting relation with the gear 16 by a nut 50. The nut 50 is threadedly secured to a threaded portion of the shaft free end portion 42. In a similar arrangement, the gear 18 is nonrotatably secured to a conical gear support portion 51 of shaft 14 adjacent the shaft free end portion 44 by a washer 54 and a nut 56 that is threadedly secured to a threaded portion of shaft free end portion 44. The nut 56 urges the washer 54 into abutting relation with the gear 18. This arrangement facilitates rapid removal and change of the gears 16 and 18 on the shaft free end portions 42 and 44.

The intermediate gears 20 are operable to transmit rotation from the drive shaft 12 to the driven shaft 14 and include a first gear 58 positioned in meshing relation with the gear 16 and a second gear 60 positioned in meshing relation with the gear 18. The intermediate gears 20 are maintained in meshing relation with the gears 16 and 18 by a gear change assembly generally designated by the numeral 62. The gear change assembly includes a T-shaped member 64 having a longitudinal portion 66 pivotally connected by a pivot pin 68 to the wall 26. The longitudinal portion 66 extends from the pivot pin 68 and expands into an arcuate end portion 70. A longitudinal slot 72 is formed in the longitudinal portion 66 and extends from adjacent the pin 68 to the arcuate end portion 70. Positioned on opposite sides of the slot 72 are a pair of arcuate slots 74 and 76 in the arcuate end portion 70.

The T-shaped member 64 of the gear change assembly 62 is pivotal about the pin 68 connected to the wall 26 so that the arcuate portion 70 is movable along an arcuate path. The T-shaped member 64 is operable to be rigidly secured in a preselected pivotal position as required for selectively positioning the gears 58 and 60 to maintain the gears in meshing relation with the gears 16 and 18 respectively. The pivotal position of member 64 varies with the size of the gears comprising the gear train. The relative position of member 64 may be adjusted to accommodate different sized intermediate gears and different sized drive and driven gears. This type of gear change device permits a relatively infinite change in the angular velocity of the driven shaft 14 within the space limits of the gear case.

Figure 2:
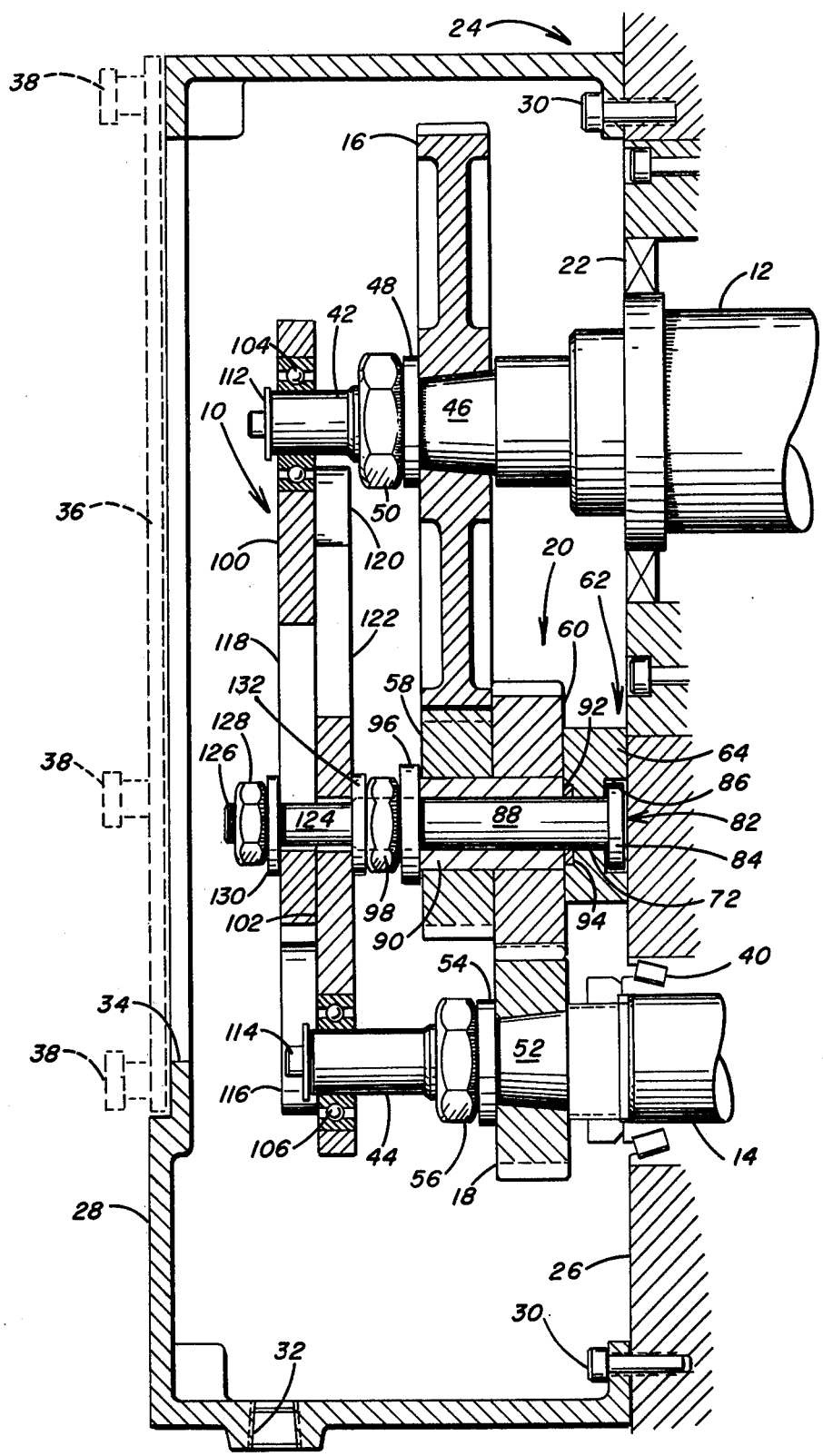
FIG. 2 is a view in section of the gear support assembly taken along line 2—2 of FIG. 1, illustrating the drive shaft, the driven shaft and the intermediate shaft supported by support arm members.

As illustrated in FIG. 2, one surface of the T-shaped member 64 is positioned in abutting relation with the surface of the wall 26. The member 64 is maintained in a preselected pivotal position on the wall 26 by a locking device generally designated by the numeral 78 that is retained in the arcuate slot 76 of the arcuate end portion 70. The locking device 78 is releasably engaged to the wall 26 at one end (not shown) and extends upwardly through the slot 76 of the member 64 so that an expanded end portion 80 slidably engages the shoulder surrounding the slot 76 of arcuate end portion 70. Thus in order to freely pivot the member 64 about the pivot pin 68, the locking device 78 is released to permit relative movement between the member end portion 70 and the locking device 78. This releases the T-shaped member 64 for movement to a preselected pivotal position. When the expanded end portion 80 of locking device 78 is moved into abutting locking relation with the member end portion 70, the member 64 is restrained from pivotal movement on the frame 26.

The gear change assembly 62 also includes an intermediate shaft 82 that has an enlarged end portion 84. The end portion 84 is slidably retained in a recessed portion 86 of the longitudinal portion 66 of T-shaped member 64. The recessed portion 86 underlies the longitudinal slot 72 and extends the length of the slot 72 so that the intermediate shaft 82 is longitudinally movable in the slot 72 to a preselected location on the longitudinal portion 66.

The intermediate shaft 82 has an intermediate portion 88 that extends from the enlarged end portion 84 upwardly and through the slot 72. The intermediate portion 88 supports a bushing 90 upon which the intermediate gears 20 are positioned for rotation relative to the intermediate shaft 82. One end portion of the bushing 90 is positioned in abutting relation with a spacer member 92 that surrounds the shaft portion 88 and is retained within a recess 94 that overlies the longitudinal slot 72. The opposite end portion of the bushing 92 is positioned in abutting relation with a washer 96 that is urged into abutting relation with the bushing 90 by a nut 98 that is mounted on a threaded end portion of the shaft 82. With this arrangement, the bushing 90 is restrained from longitudinal movement on the shaft 82 between the spacer 92 and the washer 96.

The intermediate gears 58 and 60 are secured in position on the shaft 88 in a manner to permit the gears to freely rotate and remain in meshing relation with the gears 16 and 18 to transmit rotation from the drive shaft 12 to the driven shaft 14.

As stated hereinabove, the shaft end portions are rigidly supported by the gear support assembly 10 to prevent deflection of the shafts and maintain a positive drive connection between the shafts by the meshing engagement of the gears. Preferably, the gear support assembly 10 includes a pair of support arms 100 and 102 which rotatably support the shaft end portions 42 and 44 by bearings 104 and 106. As illustrated in FIG. 2, the bearings 104 and 106 are retained within bores 108 and 110 of the arms 100 and 102 respectively. The support arms 100 and 102 are retained on the shaft end portions 42 and 44 by washers 112 and cap screws 114. With this arrangement, the support arms 100 and 102 are supported for movement about the longitudinal axes of rotation of the shafts 12 and 14 respectively.

The support arm 100 includes an opposite end portion 116, and a slot 118 extends from the end portion 116 along the longitudinal axis of the support arm 100 for a major portion of the length of the arm. Similarly, the support arm 102 has an opposite end portion 120, and a slot 122 extends from the end portion 120 along the longitudinal axis of the support arm 102 for a major portion of the length of the arm. The arm members 100 and 102 are pivoted into overlying relation to a position where portions of the slots 118 and 122 are positioned in overlying relation to permit the free end portion 124 of the intermediate shaft 82 to pass through the slots so that a threaded end portion 126 of intermediate shaft 82 extends beyond the support arms 100 and 102.

As illustrated in FIG. 2, with the support arm members 100 and 102 positioned with the slots 118 and 122 in overlying relation, the arm members intersect and portions of the arm members are positioned in overlying and abutting relation. The arm members 100 and 102 are retained in this position by a nut 128 which is threadedly advanced on the threaded free end 126 of intermediate shaft 82 to urge a washer 130 into abutting relation with the body of the support arm 100 so that the arm 100 is urged into abutting relation with the arm 102. This urges the support arm 102 into abutting relation with the washer 132. Thus, by threading the nut 128 onto the threaded free end 126, the support arms 100 and 102 are urged into abutting relation with each other and with the washers 130 and 132 respectively to form a rigid connection and rigidly secure the support arms to the intermediate shaft 82.

With the above described arrangement, the support arms 100 and 102 may be positioned to support the drive shaft and driven shaft end portions 42 and 44 and the intermediate shaft end portion 124 for a preselected position of the intermediate shaft 82 when the T-shaped member 64 is pivoted and moved longitudinally to a preselected position to mesh the intermediate gears 20 with the gears 16 and 18. The position of the T-shaped member 64 and the location of the intermediate shaft 82 in the slot 72 is determined by the size of the gears mounted on the respective shafts. It is the provision of the longitudinal slots 118 and 122 in support arms 100 and 102 that permits adjustments in the position of the support arms to both receive the intermediate shaft 82 and provide a rigid support between the respective shafts.

The present invention as discussed hereinabove is operable to transmit non-continuous, intermittent rotation of the drive shaft 12 to the driven shaft 14 and thereby rotate a feed roll mounted on the driven shaft 14 at a preselected angular velocity for intermittently feeding a preselected length of stock material to a punch press. The stock material is fed to the punch press when the feed roll is rotated and feed is interrupted to the punch press when the feed roll does not rotate.

The intermittent feeding of the stock material to the punch press by the intermittent rotation of the driven shaft 14 and the feed roll attached thereto is accomplished by operation of a drum-type cam (not shown), as disclosed in U.S. application Ser. No. 836,310. A first portion of the cam is drivingly connected to the crankshaft of the punch press and a second portion is drivingly connected to the drive shaft 12.

The drum-type cam translates continuous, uniform rotation of the crankshaft to a non-continuous, step-by-step, intermittent rotation of the drive shaft 12. Then the gears 16 and 18 and intermediate gears 20 transmit the intermittent rotation of the drive shaft 12 at one angular velocity to intermittently rotate the driven shaft 14 at another angular velocity.

Thus, it will be apparent from the present invention that a change in the feed length of the stock material to the punch press is made by changing the gears that transmit rotation from the drive shaft to the driven shaft 14. This operation is rapidly and efficiently performed by releasing the support arms 100 and 102 from their connection to the end portions 124 of the intermediate shaft 82 by removing the nut 128 from the threaded portion 126. The support arms 100 and 102 are then removed from their respective shaft end portions 42 and 44 by disengaging the cap screws 114 and the washers 112. Once the support arms are removed from the shaft end portions 42, 44 and 126, the gears 16 and 18 and the intermediate gears 20 are easily removed from shafts 12, 14 and 88 by disengaging the nuts 50, 56 and 98. This permits the gears to be pulled from their respective shafts, and a new set of gears corresponding to another preselected feed length mounted on the shafts.

A new set of gears may be installed by first mounting a gear on either the driven shaft 14 or the drive shaft 12 and then mounting the intermediate gears on the intermediate shaft portion 88. In order to obtain meshing relation of the intermediate gears with the gears on the drive and driven shafts, the T-shaped member 64 must be moved to a preselected pivotal position and the connecting member 82 longitudinally moved in the slot 72 to a preselected position on the longitudinal portion 66. In this manner, the intermediate gears are properly located in the gear case 24 so that the set of gears are positioned in meshing relation with the drive and driven gears and the T-shaped member 64 locked in this preselected position.

Once the gears 16, 18, 58 and 60 are secured in place on their respective shaft end portions, the support arms 100 and 102 are returned to position. This is accomplished by aligning the slots 118 and 122 to receive the connecting member 82 so that the intermediate shaft end portion 126 extends through the slots. The arms are then moved longitudinally relative to the connecting member 82 to permit the arms to be moved to a position for mounting on the shaft end portions 42 and 44. The arms are then secured in place on the shaft end portions. The opposite ends of the support arms are then secured to the intermediate shaft 82 by positioning the nut 128 on the shaft threaded end portion 126. This secures the support arms 100 and 102 to the intermediate shaft 82 to, in turn, rigidly connect and support the shaft end portions 42, 44 and 124.

With the above arrangement, the free ends of shafts 12, 14 and 82 are secured to each other by the support arms 100 and 102 so that the shafts are now supported on opposite sides of the gears and deflection of the shafts due to the torque imparted thereto during acceleration and deceleration is eliminated.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A gear support assembly comprising,
a drive shaft rotatably supported in a wall,
said drive shaft having a free shaft end portion,
a first gear nonrotatably secured to said drive shaft adjacent said drive shaft free end portion,
a driven shaft rotatably supported in said wall in spaced parallel relation to said drive shaft,
said driven shaft having a free shaft end portion,
a second gear nonrotatably secured to said driven shaft adjacent said driven shaft end portion,
intermediate gear means positioned in meshing relation with said first gear and said second gear for transmitting rotation from said drive shaft to said driven shaft,
said wall having gear change means connected thereto,
an intermediate shaft supported by said gear change means and having a free end portion, said intermediate shaft rotatably supporting said intermediate gear means in meshing relation with said first gear and said second gear, first support means rotatably connected to said drive shaft end portion, second support means rotatably connected to said driven shaft end portion, and said first and second support means each being rigidly connected to said intermediate shaft to thereby connect the end portions of said shafts and prevent deflection of all of said shafts.

2. A gear support assembly as set forth in claim 1 wherein, said intermediate shaft includes a second end portion secured to said gear change means, said intermediate gear means being rotatably supported on said intermediate shaft between said end portions thereof.

3. A gear support assembly as set forth in claim 1 which includes, said gear change means having a first portion pivotally secured to said wall and a second portion extending from said first portion adjustably secured to said wall, said second portion arranged to pivot said gear change means and adjust the position of said intermediate shaft relative to said other shafts.

4. A gear support assembly as set forth in claim 1 which includes, said first support means having one end portion rotatably positioned on said drive shaft end portion for pivotal movement about the longitudinal axis of said drive shaft and an opposite end portion rigidly connected to said intermediate shaft end portion, said second support means having one end portion rotatably positioned on said driven shaft end portion for pivotal movement about the longitudinal axis of said driven shaft and an opposite end portion rigidly connected to said intermediate shaft end portion, and fastening means releasably engaged to said intermediate shaft end portion for securing said first and second support means in a preselected position to thereby rigidly support all of said shaft end portions.

5. A gear support assembly as set forth in claim 1 which includes, said first support means having bearing means for rotatably supporting said drive shaft end portion, said drive shaft end portion having means for releasably connecting said first support means to said drive shaft end portion to permit removal of said first support means from said drive shaft to facilitate a gear change on said drive shaft, said second support means having bearing means for rotatably supporting said driven shaft end portion, and said driven shaft end portion having means for releasably connecting said second support means to said driven shaft end portion to permit removal of said support means from said driven shaft to facilitate a gear change on said driven shaft.

6. A gear support assembly as set forth in claim 1 which includes, locking means for securing said gear change means to said wall in a preselected pivotal position relative to said drive shaft and said driven shaft, said intermediate shaft being movable along a straight line to a preselected position on said gear change means to thereby permit pivoted and straight line movement of said intermediate shaft relative to said drive shaft and said driven shaft, and said first and second support means being connected to said intermediate shaft to thereby rigidly connect said drive shaft end portion and said driven shaft end portion to said intermediate shaft for each position of said intermediate shaft on said gear change means.

7. A gear support assembly as set forth in claim 1 wherein, said first support means includes a first arm member, said first arm member having one end portion rotatably connected to said drive shaft end portion and a second end portion having a slot extending longitudinally in said first arm member, said second support means including a second arm member having one end portion rotatably connected to said driven shaft end portion and a second end portion having a slot extending longitudinally in said second arm member, said first and second arm members being positioned on said drive shaft end portion and said driven shaft end portion to pivot into position where portions of said respective slots are aligned in overlying relation, and fastening means being secured to said intermediate shaft and extending through said aligned slots to connect said first and second arm members to said intermediate shaft.

8. A gear support assembly as set forth in claim 1 wherein, said gear change means includes a T-shaped member pivotally connected to said wall, means for securing said T-shaped member in a preselected pivoted position to position said intermediate gear means in meshing relation with said first and second gears, said intermediate shaft member supported at one end for longitudinal movement to a preselected position on said T-shaped member and an opposite free end portion extending from said T-shaped member, said first and second support means each having elongated slots for receiving said intermediate shaft member free end portion, and fastening means positioned on said intermediate shaft member free end portion for securing said first and second support means to said intermediate shaft member and thereby support all of said shaft end portions to prevent deflection thereof.

* * * * *